United States Patent
Phares

[11] 3,909,576
[45] Sept. 30, 1975

[54] CHAIN LINK AND JOINER HEATER
[75] Inventor: Earl K. Phares, Hammond, Ind.
[73] Assignee: S. G. Taylor Chain Company, Inc., Hammond, Ind.
[22] Filed: Dec. 17, 1973
[21] Appl. No.: 425,333

[52] U.S. Cl. .................................. 219/51; 219/52
[51] Int. Cl.[2] .................. B21L 21/00; H05B 3/06
[58] Field of Search ............ 219/51, 52; 59/31, 33, 59/34

[56] References Cited
UNITED STATES PATENTS
2,144,319  1/1939  Taylor .......................... 219/52 X
2,809,269  10/1957  Storck et al. ..................... 219/51

Primary Examiner—J. V. Truhe
Assistant Examiner—N. D. Herkamp
Attorney, Agent, or Firm—McDougall, Hersh & Scott

[57] ABSTRACT

A chain link and joiner link heater and a method for its operation wherein spaced-apart electrodes are provided for supporting a single chain link. Clamp means are utilized for holding the chain link in position on the electrodes with the clamping means being independently operated to permit adjustment of the electrode spacing depending upon the size of the link involved. The structure permits supporting of a link in a manner such that the application of current provides for heating of a link body portion intermediate the ends of the link while avoiding any significant amount of heat at the exposed ends of the link so that subsequent welding operations can be efficiently carried out.

5 Claims, 9 Drawing Figures

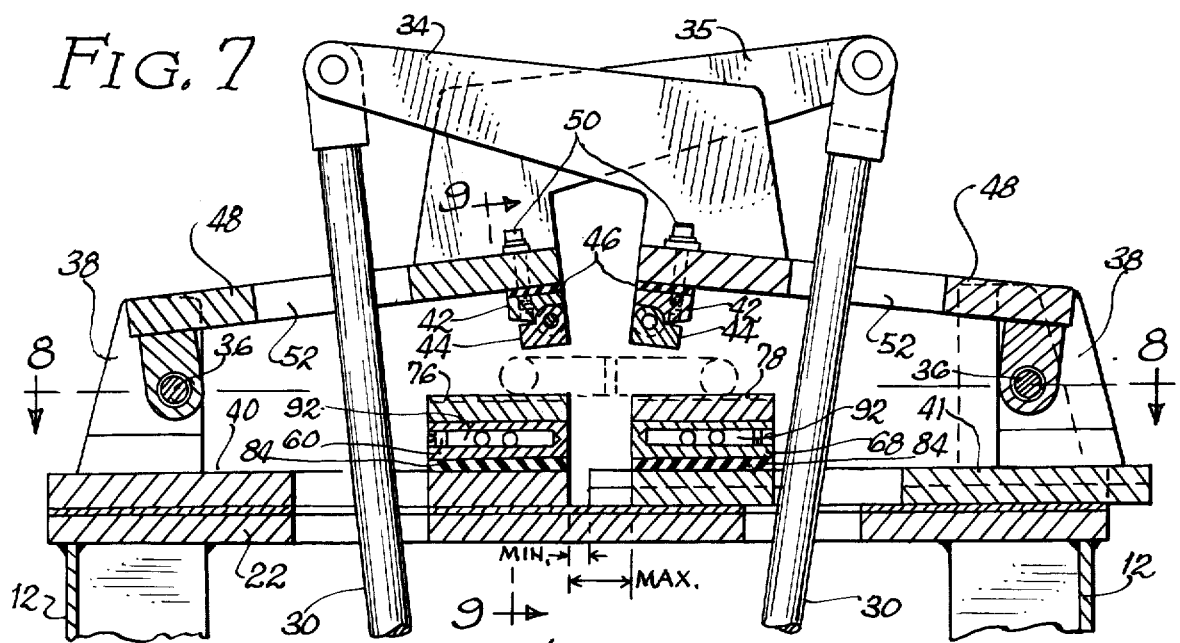
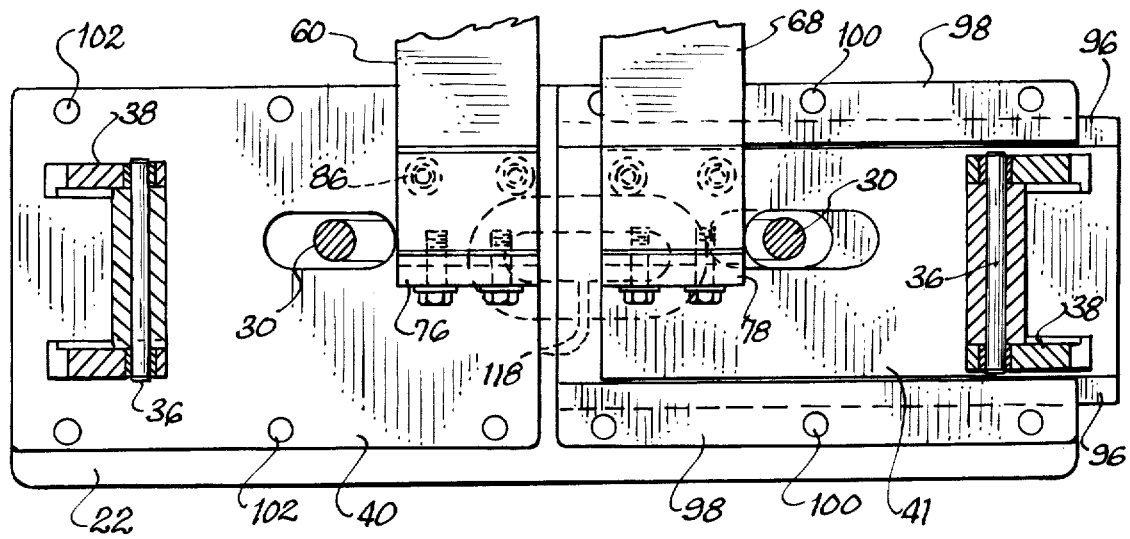
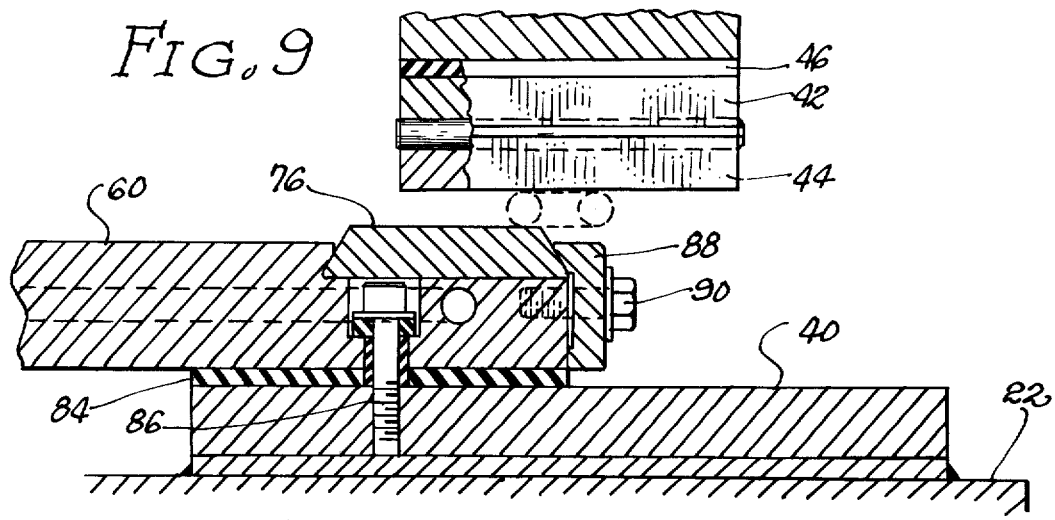

CHAIN LINK AND JOINER HEATER

This invention relates to an apparatus useful for heating chain links and joiner links. The invention is also directed to a method for operating the apparatus whereby subsequent operations including welding can be carried out in an efficient manner.

The invention particularly concerns an apparatus and method which greatly facilitates chain repair operations. Chain repair operations are regularly conducted by industry in order to insure that continued use of chains can be safely carried out.

"Sling" chains which are widely employed in industry in conjunction with cranes provide typical examples of chains which can be efficiently repaired through utilization of the apparatus and method of this invention. Such chains are often subjected to quite heavy loads, and it is, therefore, necessary to maintain the chains in proper condition in order to avoid down time of equipment. More importantly, and particularly in the case of overhead cranes, the chains must be kept in good repair to avoid injury to workmen and damage to goods being carried as well as to structures in the adjacent plant areas.

Particularly as explained in Booth application Ser. No. 290,872, filed on Sept. 21, 1972, chain repair operations have become even more significant because of legislation which has been enacted requiring periodical inspection of chain. The inspection must be thorough enough to insure that a chain is in proper operating condition, and this requires relatively careful inspection procedures. In particular, proper inspection requires removal of the chain from the crane or other equipment in order that the chain sections can be thoroughly studied and to permit the replacement of any links which do not meet required standards.

The necessity for removing chain from equipment creates significant problems for users since a new chain must be made available so that the equipment will not have a lengthy down-time. In view of the fact that regulations require frequent chain inspection, it is necessary to provide substitute chains for all equipment involved, and this can lead to significant expense and inventory problems for larger industries.

The aforementioned application discloses a system which facilitates chain inspection. It is a general object of this invention to provide a heating apparatus and method useful in such a system and also useful independently of the system whereby defective chains can be repaired on a highly efficient basis.

It is a further object of this invention to provide a chain link and joiner heating apparatus which includes means for quickly heating individual chain links and which operates in a manner such that the chain links can be subsequently welded without the necessity for any significant additional steps in preparation for welding.

These and other objects of this invention will appear hereinafter and for purposes of illustration, but not of limitation, specific embodiments of the invention are shown in the accompanying drawings in which:

FIG. 7 is an enlarged fragmentary cross-sectional view illustrating details of the clamp and electrode mechanisms utilized in the construction;

FIG. 8 is a horizontal cross-sectional view taken about the line 8—8 of FIG. 7; and, FIG. 9 is a vertical cross-sectional view taken about the line 9—9 of FIG. 7.

Figure 1:
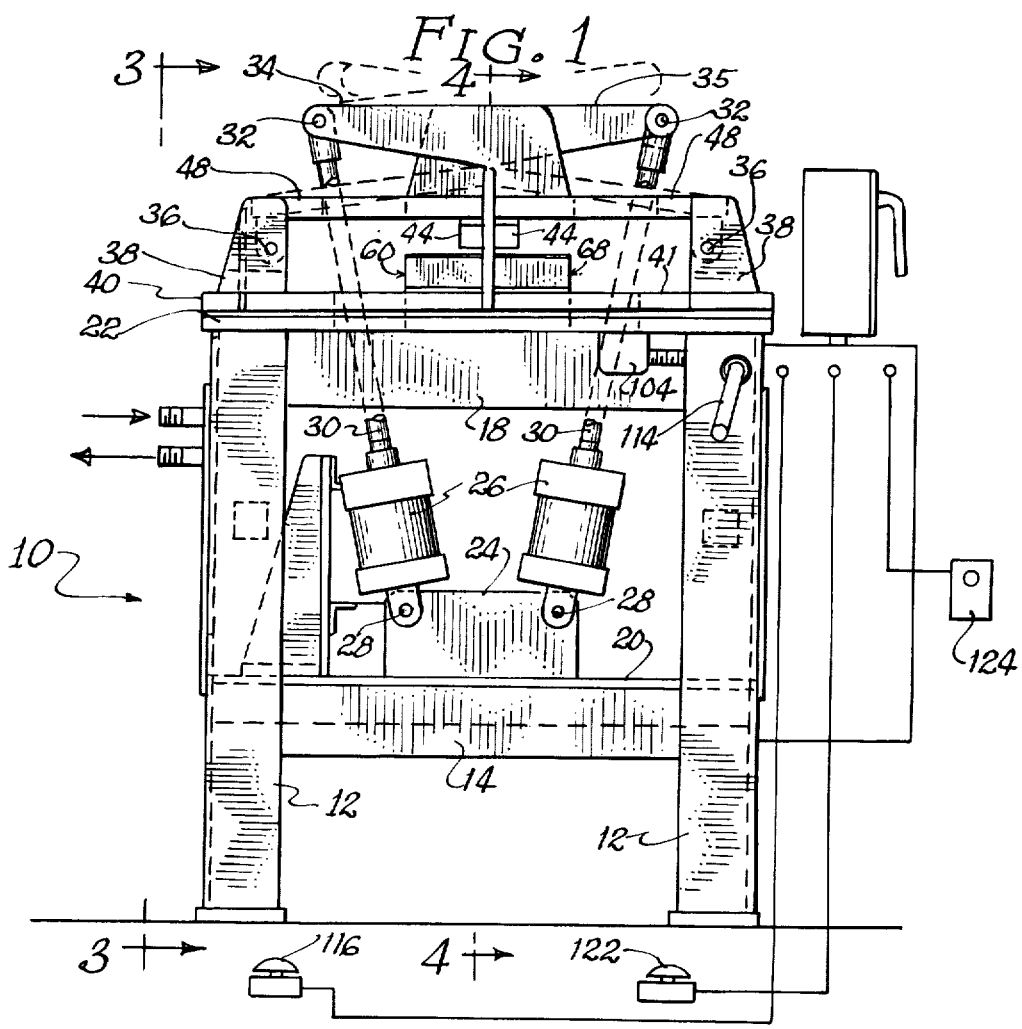
FIG. 1 is an elevational view of a heating apparatus characterized by the features of this invention.
Figure 2:
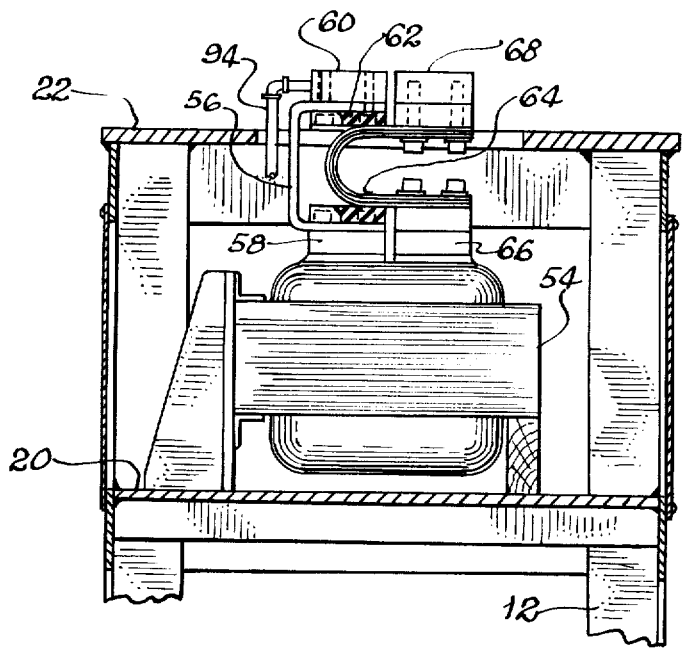
FIG. 2 is a fragmentary cross-sectional view of the apparatus shown in FIG. 1.
Figure 3:
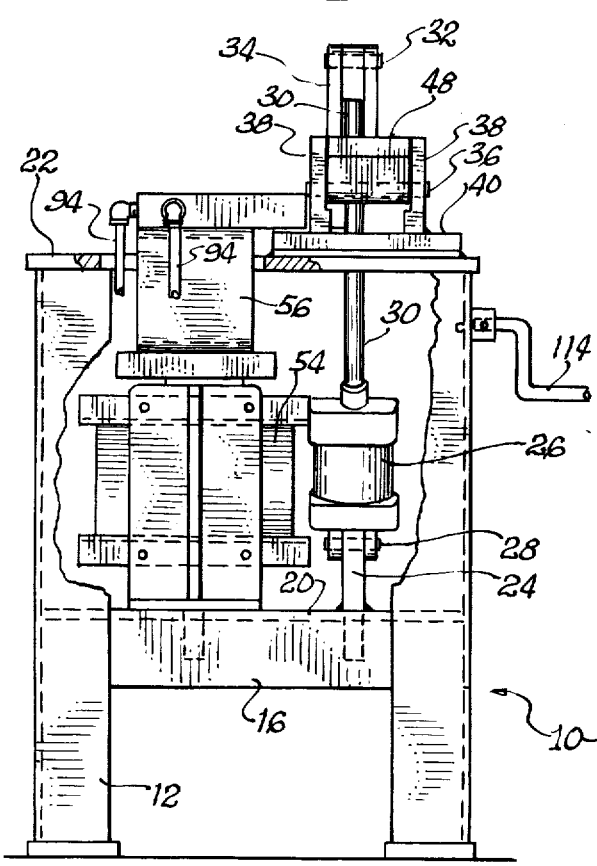
FIG. 3 is a side elevational view, partly cut away, taken about the line 3—3 of FIG. 1.
Figure 4:
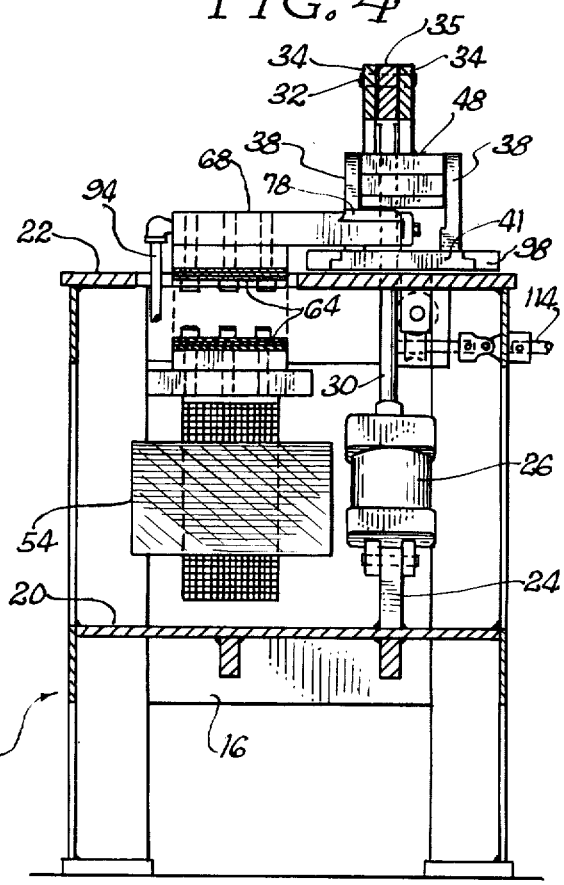
FIG. 4 is a vertical sectional view taken about the line 4—4 of FIG. 1.

This invention generally relates to an apparatus for heating chain links and to a method for utilizing the apparatus. The system of the invention more specifically comprises a pair of spaced apart electrodes which are provided for supporting a single chain link spanning the gap between the electrodes. Means are provided for supplying electrical power to the electrodes, and clamps are utilized for holding links in place relative to the electrodes.

In practice, the chain link is located in the apparatus with a body portion of the chain link extending between the spaced apart electrodes. The chain link is located in position so that the free ends of the link which define the gap are out of any contact with the electrodes. Electrical power is applied, and this results in the generation of heat in the body portion extending between the electrodes. The free ends of the links are, however, not subject to any significant heat build-up so that oxidation or other change in characteristic of these ends will not occur. Accordingly, a subsequent welding operation can be carried out without difficulty.

The electrode and clamp mechanisms utilized in the construction are arranged so that links of different sizes can be accommodated. In particular, a clamp is provided for holding a link portion adjacent one electrode. The other electrode is movable whereby the most efficient position of the electrode relative to the link can be provided. An independently operated clamp is then utilized for holding a separate portion of the link in position relative to the movable electrode.

The drawings illustrate a heat treating apparatus 10 comprising vertical supports 12, intermediate horizontal frame members 14 and 16, and upper horizontal frame members 18. The frame members 14 and 16 support an intermediate shelf 20, and a top plate 22 is supported by the frame members 18.

A support 24 mounted on the shelf 20 has cylinders 26 pivotally connected thereto at 28. These cylinders each form an assembly with pistons 30 which are connected at their ends 32 to clamp supports 34 and 35. The supports are pivotally mounted on supporting shafts 36 which are carried by upstanding brackets 38. These brackets are in turn positioned on horizontally disposed members 40 and 41 mounted on the top plate 22.

As best shown in FIGS. 7 and 9, the supports 34 and 35 carry clamps formed of a stationary section 42 and a pivotally connected section 44. The sections 44 comprise the link engaging portions of the clamp. An insulating sheet 46 is located between the clamp sections 42 and the arms 48 of the clamps whereby the clamp sections are insulated from the associated structure. Bolts 50 are utilized for removably attaching the clamps to the supports and suitable insulation is provided in this regard. Openings 52 defined by the support arms 48 provide for freedom of movement of the pistons 30 so that extension of the pistons will pivot the respective clamps to the unclamped position while retraction of the pistons moves the clamps into their holding position.

The shelf 20 also supports a transformer 54. A first electrical lead 56 extends from the transformer terminal 58 into contact with a first electrode 60. The lead 56 is in direct contact with the electrode, and an insulator 62 serves to hold the lead out of contact with other portions of the apparatus.

A second lead 64 in the form of a flexible conductive strap extends from the transformer terminal 66 into contact with the other electrode 68. Insulator 70 separates this flexible strap from the lead 56 attached to the terminal 58 and the insulator 62 maintains the electrode 60 out of contact with this flexible strap so that power can be properly transmitted through the respective electrodes when the space between the electrodes is spanned by a conductive material. This circuit remains completed even though the electrode 68 is mounted for adjustment since the strap 64 will follow the movements of the electrode while maintaining the electrical connection between the terminal 66 and the electrode 68.

Figure 5:
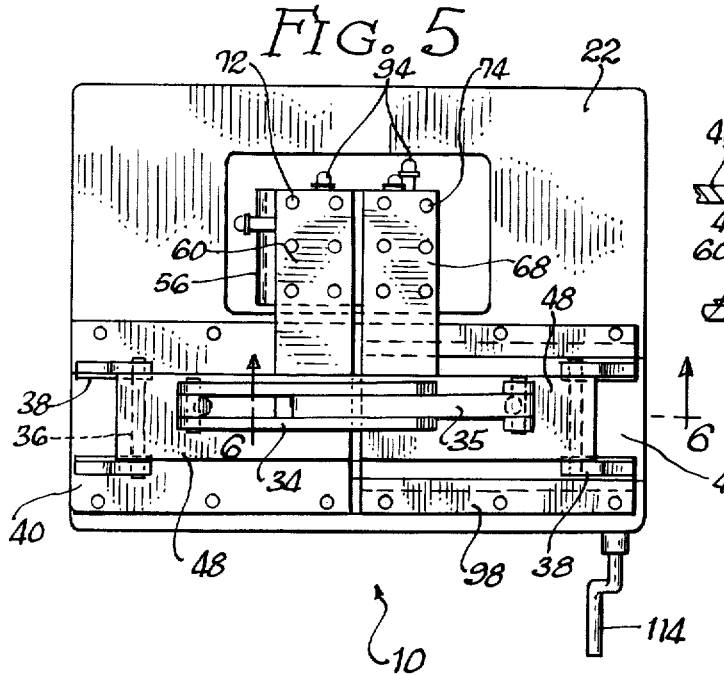
FIG. 5 is a plan view of the apparatus.

As best shown in FIG. 5, the electrodes 60 and 68 define bores for receiving bolts 72 and 74 whereby the electrodes can be attached respectively to the leads 56 and 64. The electrodes also define link engaging areas which extend outwardly of the areas receiving the fastening bolts. As shown in FIG. 9, replaceable contact plates 76 are carried by the electrode 60, and a corresponding plate 78 is carried by the electrode 68 (FIG. 7). The electrodes are secured to the block members 40 and 41 which are mounted on the table 22. Insulating strips 84 serve to insulate the electrodes with respect to the table, and bolts 86 are utilized for holding the electrodes in place relative to the blocks.

As indicated, the contact plates 76 and 78 are replaceable since these plates are subject to deterioration over a period of time. As shown in FIGS. 8 and 9, the plates are held in place by means of clamp bars 88 secured to the electrodes by means of bolts 90. When these bolts are backed off, the plates 76 and 78 can be easily removed and new plates locked in position.

Coolant passages 92 are defined by each of the electrodes, and coolant lines 94 communicate with these passages for purposes of maintaining the electrodes at acceptable temperature levels.

The block 41 which supports the electrode 68 defines edge portions 96 which are received within guide plates 98, these plates being secured to the table 22 by means of bolts 100. As shown in FIG. 8, the block 40 is secured to the table 22 by means of bolts 102, and this block and the associated electrodes 60 are, therefore, held stationary.

Figure 6:
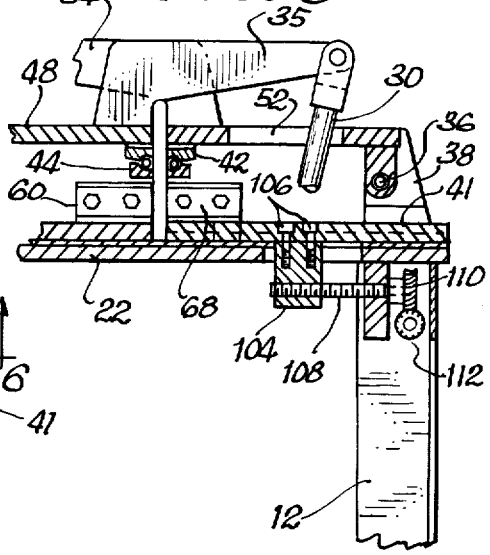
FIG. 6 is a fragmentary cross-sectional view taken about the line 6—6 of FIG. 5.

The movable block 41 has a downwardly extending member 104 secured thereto by means of bolts 106 (FIG. 6). The member 104 defines a threaded bore which receives screw 108. One end of this screw supports gear 110 which meshes with worm 112. The latter is rotatable by means of handle 114 whereby rotation of the handle operates to move the block 104 and the associated block 41 depending upon the direction of rotation. This provides for adjustment of the position of electrode 68 relative to the electrode 60 so that the opening defined between these electrodes can be changed depending upon the size of a link being treated. The brackets 38 mounted on the block 41 and the associated clamp structure 34 will also move so that the clamp section 42 opposite electrode 68 will automatically adjust with the electrode.

Although other uses for the apparatus of the invention are contemplated, the primary function of the invention is to provide for heating of chain or joiner links in the course of chain repair operations. In such operations, it is necessary to heat the links so that the links can be easily bent to facilitate connection with lengths of chain. In conducting the heating operation with the apparatus of the invention, a particular link is first located in position on the contact plate 76 of electrode 60. The clamp for this electrode is then operated preferably by pushing a foot pedal 116 whereby the clamp element 44 will engage the link and securely hold the link in position.

The handle 114 is then operated in the event that the electrode 68 is not in the proper position. In this connection, it is preferred that the opening between the electrodes be increased for the larger links so that the most efficient use of the heat generated will be accomplished. As best shown in FIG. 8, the links are arranged so that the gap between the ends 118 is located in the opening between electrodes. The main body portion of the link spans the opening between the electrodes and current will, therefore, be substantially confined to this body portion with virtually all of the heat being generated in this area and with no significant amount of heat being generated adjacent the ends 118. Since larger links will require a greater force for bending during an assembly operation, it is preferred that the heated area be increased to a maximum. On the other hand, a lesser heat requirement is encountered for the smaller links so that the spacing between the electrodes can be minimized.

Once the desired electrode spacing is achieved, the other foot pedal 122 is operated to clamp the opposite side of the link relative to the electrode 68. A pushbutton 124 is provided for the application of power through the transformer to achieve the heating operation. Once the heating has been completed, the foot pedals can then be operated to release the link.

In utilizing the apparatus, it will be appreciated that the electrode adjusting operation could be conducted before either of the clamps are operated. In any event, the described operation avoids any significant oxidation of the ends of the links thereby eliminating the necessity for expensive grinding to remove oxidation, or other steps in preparation for welding. Such preparation is required where heating of the links takes place in a furnace.

The structure of the invention is particularly suitable for incorporation of automatic controls. Thus, timing means providing a specific heating for each link depending on the size involved can be readily developed thereby increasing the speed and accuracy of the operation.

It will be understood that various changes and modifications may be made in the above described construction which provide the characteristics of the invention without departing from the spirit thereof particularly as defined in the following claims.

I claim:

1. An apparatus for heating chain links comprising a pair of spaced apart electrodes, said electrodes each defining a horizontal link supporting surface and being dimensioned to support a single, horizontally disposed chain link spanning the gap between the electrodes, means for supplying electrical power to the electrodes, and clamp means for holding the single chain link in position on the electrodes, said clamp means comprising a pair of separate members each defining a link engaging surface, said separate members being disposed, respectively, above an electrode surface whereby said link lies flat relative to said supporting surfaces and is held in this position by said separate members, each of said clamps being attached to a pivotally mounted support, separate cylinder and piston assemblies, the piston of each assembly being connected to one support, and separate control means for reciprocally moving the respective pistons to thereby release and apply said clamps, a table, the control means for the respective clamps being positioned adjacent the bottom of said table for foot operation of the control means, said table defining a top area for supporting said electrodes and clamps, manually operable means carried on said table for adjusting the relative positions of said electrodes to accommodate links of different sizes, means mounting said piston and cylinder assemblies on said table beneath said top area, and wherein said separate members on said clamp means include pivotally connected link engaging portions associated with said clamps whereby said clamps are adapted to adjust to links of different sizes, said link defining an opening between the link ends and said opening being positioned in the area of the gap between the electrodes whereby substantially all of the heat generated upon application of electrical power is generated in a portion of the link spaced inwardly from said ends.

2. A construction in accordance with claim 1 wherein one of said electrodes is mounted on a sliding support, a screw connected to said support, and means for manually rotating said screw to adjust the position of the support and the associated electrode.

3. An apparatus in accordance with claim 2 including a flexible conductive strap extending between said one electrode and said means for applying electrical power whereby said one electrode can be adjusted while maintaining a connection with said means for supplying electrical power.

4. An apparatus in accordance with claim 1 wherein said means for supplying electrical power are also mounted on said table beneath said top area, and control means on said table for manually operating said power supply means.

5. An apparatus in accordance with claim 1 wherein one of said electrodes is stationary and the other electrode is mounted on a movable support, and wherein a clamp means associated with the other electrode is also movably supported for adjustment with said other electrode in response to operation of said manually operable means.

* * * * *